United States Patent [19]

Huff

[11] Patent Number: 6,001,185
[45] Date of Patent: Dec. 14, 1999

[54] METHOD FOR TREATMENT OF HEAVY METAL CONTAMINATION

[76] Inventor: Carl L. Huff, P.O. Box 13, Reagan, Tex. 76680

[21] Appl. No.: 09/183,035

[22] Filed: Oct. 30, 1998

[51] Int. Cl.⁶ ...................................................... B08B 3/10
[52] U.S. Cl. ...................... 134/2; 134/4; 134/7; 588/231; 588/236; 451/37
[58] Field of Search .................................. 134/2, 4, 6, 7, 134/38; 588/231, 236, 249, 256, 260; 451/37, 38, 39

[56] References Cited

U.S. PATENT DOCUMENTS

| | | | |
|---|---|---|---|
| 4,902,427 | 2/1990 | Szczepanik | 210/484 |
| 5,013,453 | 5/1991 | Walker | 210/712 |
| 5,152,836 | 10/1992 | Hirano et al. | 106/690 |
| 5,162,600 | 11/1992 | Cody et al. | 588/236 |
| 5,266,122 | 11/1993 | Rapp et al. | 134/7 |
| 5,338,356 | 8/1994 | Hirano et al. | 106/690 |
| 5,512,702 | 4/1996 | Ryan et al. | 588/256 |
| 5,527,982 | 6/1996 | Pal et al. | 588/256 |
| 5,637,355 | 6/1997 | Stanforth et al. | 427/341 |
| 5,667,696 | 9/1997 | Studer et al. | 210/702 |
| 5,674,108 | 10/1997 | Rolle | 451/38 |
| 5,678,233 | 10/1997 | Brown | 588/2 |
| 5,797,992 | 8/1998 | Huff | 134/7 |

OTHER PUBLICATIONS

Lewicke, Environ. Sci. Technol., vol. 6, pp. 321–322 (1972).
Yang, Journal Hazardous Materials, vol. 34, No. 2, pp. 235–243 (1993).
Ma et al., Environ. Sci. Technol., vol. 29, pp. 1118–1126 (1995).

*Primary Examiner*—Frankie L. Stinson
*Attorney, Agent, or Firm*—Jackie Lee Duke

[57] ABSTRACT

A method for treatment of heavy metal contaminated surface coatings, heavy metal contaminated industrial byproducts and industrial effluents utilizing calcium phosphate compounds to render the heavy metal compounds immobile and biologically nonhazardous to humans. In a first embodiment surfaces contaminated with heavy metal compounds are decontaminated in situ during their removal. Solid calcium phosphate material is added to the liquid or chemical paint remover before the paint remover is applied to the heavy metal contaminated painted surface. After application of the paint remover, it is removed by suitable means as scraping or water blasting. The paint and paint remover mixture thus removed is rendered non-toxic with the heavy metal compounds in the paint immobile and biologically nonhazardous. In a second embodiment of the invention, the calcium phosphate compounds are used in a floor sweeping compound to treat the heavy metal contaminated dust generated during industrial processes. Another embodiment uses the calcium phosphate compounds to treat the effluents of industrial furnaces and smelters and render the heavy metal compounds therein non-toxic. A fourth embodiment utilizes the calcium phosphate compounds in a finely ground form to be added to paint to produce a paint that can be applied over previously applied heavy metal contaminated paint to render the underlying heavy metal contaminated paint non-toxic. Other embodiments are shown as well.

17 Claims, No Drawings

METHOD FOR TREATMENT OF HEAVY METAL CONTAMINATION

BACKGROUND OF THE INVENTION

1. Field of the Invention

This invention relates to a novel method for treatment of heavy metals, including antimony, arsenic, barium, beryllium, cadmium, chromium, lead, mercury, nickel, selenium and silver. These heavy metals are encountered during diverse industrial processes. More specifically the current invention relates to a technology for decontamination of these heavy metals found in industrial processes and sites where these heavy metals have been used in the past or to prevent future contamination by introducing the technology in the manufacturing process. The present invention is used to render these heavy metal compounds nontoxic and therefor not requiring special handling as toxic waste.

Heavy metals, such as those listed above, are highly toxic to humans. Many of these heavy metals and compounds that contain them can be absorbed through the skin of a person in contact with the heavy metal compound. Additionally, many of these compounds can be ingested if they leach into a water supply and the water is consumed. This type of contamination often occurs when these heavy metal compounds, often the byproduct of industrial processes, are disposed of in inappropriate sites which lack the necessary safeguards to ensure the heavy metal compounds do not leach into the ground and attendant water table.

The heavy metals and the compounds that contain them have been used in a variety of industrial applications and processes. In the last quarter century, the toxicity of these heavy metal compounds has become a major health concern. As this concern has grown, the United States Environmental Protection Agency (hereinafter "U.S.E.P.A.") and state environmental agencies have promulgated testing procedures to detect the amount of heavy metals in a given sample that could pose a health or environmental hazard. The standard test established by the U.S.E.P.A. is the Toxicity Characteristic Leaching Procedure (hereinafter "TCLP"). This test measures the amount of heavy metals released into the environment by water and other environmental factors acting on a given sample. The U.S.E.P.A. has used these testing procedures to set limits on the amount of heavy metals that can be present in a given sample.

2. Description of Related Art

One method for handling such lead contaminated surface coatings is shown in U.S. Pat. No. 5,266,122 (Rapp et al.) The method shown by Rapp involves the addition of abrasive unreacted hydraulic cement to abrasive blasting media. The mixture is then used to blast the contaminated surface coating from a structure. Water is added during the blasting operation to react with the cement and form a surficial silica gel that binds the particulates into a cementicious whole.

A method for in situ treatment of lead contaminated soils using calcium phosphate compounds is shown in U.S. Pat. No. 5,512,702 (Ryan et al.) The technique of Ryan is to mix calcium phosphate compounds with soil to render the lead in the soil nontoxic.

A method for removing coatings that contain hazardous byproducts is shown in U.S. Pat. No. 5,674,108 (Rolle). A chemical compound to neutralize the hazardous compound in the coating to be removed is applied and the coating and chemical compound are removed.

A new and innovative use of calcium phosphate compounds for in situ decontamination of lead contaminated surface coatings is shown in U.S. Pat. No. 5,797,992 issued to Carl L. Huff, the inventor of the current invention. Mr. Huff's '992 patent shows a method for using calcium phosphate compounds such as apatite and synthetic hydroxyapatite to render the resultant lead compound nontoxic.

Consequently, while the use of phosphate compounds to decontaminate heavy metal contaminated materials has been shown previously, none of the prior art methods offer the ability to render a variety of heavy metals and their related compounds nontoxic.

SUMMARY OF THE INVENTION

The current invention uses phosphate compounds to render heavy metals and compounds formed from heavy metals nontoxic to humans. According to the present invention, in a first embodiment surfaces contaminated with paint or other surface coating are decontaminated in situ during their removal. Solid calcium phosphate material is added to the chemical paint remover or stripper before the paint remover is applied to the coated surface. After application of the paint remover, it is removed by suitable means as scraping or water blasting. The paint and paint remover mixture thus removed is rendered nontoxic with the heavy metal in the paint or surface coating biologically nonhazardous. The calcium phosphate can be in one of several forms that provide equally suitable results.

In a second embodiment of the invention, the calcium phosphate compounds are added to a sandblasting abrasive in sufficient amounts to render the blast waste nonhazardous. The calcium phosphate compounds are blended with the abrasive material before blasting with air, water jet or other suitable means so as to render the resulting waste nonhazardous.

In a third embodiment of the invention, the calcium phosphate compounds are used in a floor sweeping compound to treat dust contaminated with heavy metals generated during industrial processes that generate such heavy metal contaminated dust.

Another embodiment uses the calcium phosphate compounds to treat the effluents of industrial furnaces and smelters and render the heavy metal contaminated effluents generated nontoxic.

A further embodiment uses the calcium phosphate compounds in a finely ground form to be added to paint or other surface coatings to produce a paint or surface coating that can be applied over previously applied heavy metal contaminated paint to render the underlying paint nontoxic.

Yet another embodiment uses the calcium phosphate compounds in a natural or finely ground form to be added to contaminated soil or other solid waste material to render the heavy metals nontoxic.

Another embodiment uses calcium phosphate compounds in manufacturing of new products such as cleaning compounds, scrubbing agents and cleaning solutions for surface cleaning and preparations to make the removed contaminated materials nontoxic.

Still another embodiment uses the calcium phosphate compounds in all types of liquid and air filter elements to immobilize heavy metals in the filtered material and the filters themselves.

The principal objects of the present invention are: to provide an improved method for decontamination and removal of heavy metal contaminated paints from surfaces that render the heavy metal compounds in the contaminated paint nontoxic; to provide a method for decontamination and removal of heavy metal contaminated dust generated during industrial processes; to provide an improved method for treatment of the effluents of industrial furnaces and smelters and render the heavy metals therein nontoxic; to provide a method to produce a paint that can be applied over previously applied contaminated paint to render the underlying paint nontoxic; to provide an efficient and safe soil and solid waster decontaminate; to provide a method to prevent hazardous waste by manufacturing products that contain their own decontaminate; and, to provide a means of filtering heavy metal laden liquids and air without generating hazardous waste. Further features and advantages of the present invention will be apparent from the detailed description of the presently preferred embodiments.

DESCRIPTION OF THE PRESENTLY PREFERRED EMBODIMENTS

The present invention uses phosphate compounds to render heavy metal contaminated surface coatings, heavy metal byproducts and heavy metal industrial effluents nontoxic to humans. According to the present invention, in a first embodiment surfaces contaminated with heavy metal-based paint are decontaminated in situ during their removal. Solid calcium phosphate material is added to the chemical paint remover or stripper before the paint remover is applied to the painted surface. After application of the paint remover, it is removed by suitable means as scraping or water blasting. The paint and paint remover mixture thus removed is rendered nontoxic with the heavy metal in the paint immobile and biologically nonhazardous. The calcium phosphate can be in one of several forms that provide equally suitable results.

In a second embodiment of the invention, the calcium phosphate compounds are blended with abrasive materials such as sand, coal slag or other abrasive materials. The abrasive materials are then used in suitable air or water jets to remove heavy metal contaminated surface materials to render the resulting waste nonhazardous.

In a third embodiment of the invention, the calcium phosphate compounds are used in a floor sweeping compound to treat dust contaminated with heavy metals generated during industrial processes that generate such heavy metal contaminated dust. In this embodiment, the calcium phosphate compounds are ground to a finely powdered consistency and then mixed with a commonly used floor sweeping compound such as ground clay. The resultant mixture is then spread over the floor surfaces to be swept. The heavy metal contaminated dust on the floor is swept up with the mixture of finely ground calcium phosphate and ground clay. The calcium phosphate reacts with the heavy metal compounds in the dust to render the heavy metal compounds immobile and biologically nonhazardous.

A fourth embodiment uses the calcium phosphate compounds to treat the effluent streams of industrial furnaces and smelters and render the heavy metal compounds generated therein nontoxic. In this embodiment, as the effluent stream is leaving the furnace or smelter, finely ground calcium phosphate is blown across the effluent stream. The finely ground calcium phosphate mixes with the effluent stream including the heavy metal compounds. The finely ground calcium phosphate reacts with the heavy metal compounds to render them immobile and biologically nonhazardous.

A fifth embodiment uses the calcium phosphate compounds in a finely ground form to be added to paint or other surface coatings to produce an agent that can be applied over previously applied contaminated paint or surface material to render the underlying contaminated surface nontoxic. The finely ground calcium phosphate compounds in the new coating react with the heavy metal compounds in the contaminated paint or surface coating to render the heavy metal compounds immobile and biologically nonhazardous.

A sixth embodiment uses the calcium phosphate compounds as a decontaminate for soils and other solid waste to make them biologically nonhazardous. The calcium phosphate compounds are tilled into the soil or mixed with the solid waste. The calcium phosphate compounds react with the heavy metal compounds in the contaminated soil or solid waste to render the heavy metal compounds immobile and biologically nonhazardous.

A seventh embodiment uses the calcium phosphate compounds in the manufacturing of cleaning compounds, scrubbing agents and cleaning solutions for heavy metal contaminated surfaces and materials. The calcium phosphate compounds are added to the cleaning compounds, scrubbing agents and cleaning solutions during their manufacture. The modified cleaning compounds, scrubbing agents and cleaning solutions are then used for surface cleaning and preparation of the heavy metal contaminated surfaces and materials. The calcium phosphate compounds react with the heavy metal compounds washed from the contaminated surfaces to render the heavy metal compounds immobile and biologically nonhazardous.

An eighth embodiment uses the calcium phosphate compounds in liquid or air filtering applications where heavy metals are to be removed. Current sand, paper or other common filter materials are augmented with calcium phosphate compounds that react with the heavy metal compounds to render the filtered material and filters nonhazardous.

The effectiveness of using calcium phosphate as a treatment for heavy metal contamination is shown in the results of Table 1. A soil sample that was contaminated with various heavy metal compounds was used. Prior to conducting the TCLP test, the test sample was analyzed to determine the heavy metal compounds present and in what concentrations. The sample was then mixed with a 50% calcium phosphate treatment and then analyzed using the TCLP test in accordance with EPA Method 6010. The results are as follows:

TABLE 1

| Compound | Before Treatment *Results (mg/I) | After Treatment **Results (mg/I) | EPA Limit (mg/l) |
| --- | --- | --- | --- |
| Antimony (Sb) | 0.193 | 0.085 | N.A. |
| Arsenic (As) | 0.475 | 0.310 | 5.00 |
| Barium (Ba) | 8.950 | 2.100 | 100.00 |
| Beryllium (Be) | 0.551 | 0.039 | N.A. |
| Cadmium (Cd) | 0.643 | 0.070 | 1.00 |
| Chromium (Cr) | 0.804 | 0.110 | 5.00 |
| Lead (Pb) | 5.040 | 0.088 | 5.00 |
| Mercury (Hg) | 0.577 | 0.490 | 0.20 |
| Nickel (Ni) | 0.812 | 0.290 | N.A. |
| Selenium (Se) | 0.102 | 0.066 | 1.00 |
| Silver (Ag) | 0.647 | 0.011 | 5.00 |

*The soil sample was obtained from Enviromental Resource Associates, Arvada, Colorado. The certified values are based on the mean recoveries obtained by multiple laboratories performing the TCLP extraction and analyzing the extracts by ICP and atomic absorption methodologies. The soil sample is listed in their catalog as Catalog No. 544 "TCLP Metals in Soil."
**Philip Services Corp. of Houston, Texas blended and analyzed the Phosphate compound and soil sample.

My improved method of in situ treatment of heavy metal contamination and the methods of its application will be readily understood from the foregoing description and it will be seen I have provided an improved method utilizing phosphate compounds to render heavy metal contaminated surface coatings, heavy metal contaminated industrial byproducts, industrial effluents, soil and solid waste non-toxic to humans. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A method for in situ treatment of heavy metal contaminated surface coatings, comprising the steps of:
    determining the amount and type of heavy metal compounds in a heavy metal contaminated surface coating to be decontaminated,
    blending a mixture of a paint remover with an amount of calcium phosphate in sufficient concentration to react with the heavy metal compounds in said heavy metal contaminated surface coating,
    applying said blended mixture of paint remover and calcium phosphate to said heavy metal contaminated surface coating,
    allowing said blended mixture of paint remover and calcium phosphate to react with said heavy metal compounds in said heavy metal contaminated surface coating to render said heavy metal compounds immobile and biologically nonhazardous,
    removing said blended mixture of paint remover and calcium phosphate with said heavy metal contaminated surface coating, and
    said calcium phosphate is in the form of at least one compound selected from the group consisting of: naturally occurring apatite, synthetic hydroxyapatite, dibasic calcium phosphate, and phosphate rock.

2. A method for in situ treatment of heavy metal contaminated surface coatings according to claim 1 wherein:
    said heavy metal contaminated surface coating is paint.

3. A method for in situ treatment of heavy metal contaminated dust, comprising the steps of:
    determining the amount and type of heavy metal compounds in heavy metal contaminated floor dust,
    spreading a blended mixture of calcium phosphate and floor sweeping compound on said heavy metal contaminated floor dust, and
    allowing said blended mixture of calcium phosphate and floor sweeping compound to react with said heavy metal compounds in said heavy metal contaminated floor dust to render said heavy metal compounds immobile and biologically nonhazardous.

4. A method for in situ treatment of heavy metal contaminated dust according to claim 3 wherein:
    said calcium phosphate is in the form of at least one compound selected from the group consisting of: naturally occurring apatite, synthetic hydroxyapatite, dibasic calcium phosphate, and phosphate rock.

5. A method for in situ treatment of heavy metal contaminated furnace and smelter effluents comprising the steps of:
    determining the amount and type of heavy metal compounds in heavy metal contaminated furnace and smelter effluent streams,
    blowing finely ground calcium phosphate across the furnace and smelter effluent streams, and
    allowing said finely ground calcium phosphate to react with said heavy metal compounds in said heavy metal contaminated furnace and smelter effluent streams to render said heavy metal compounds immobile and biologically nonhazardous.

6. A method for in situ treatment of heavy metal contaminated furnace and smelter effluents according to claim 5 wherein:
    said calcium phosphate is in the form of at least one compound selected from the group consisting of: naturally occurring apatite, synthetic hydroxyapatite, dibasic calcium phosphate, and phosphate rock.

7. A method for in situ treatment of heavy metal contaminated surface coatings comprising the steps of:
    blending finely ground calcium phosphate with a surface coating to be applied over previously applied heavy metal contaminated surface coatings,
    applying said blend of finely ground calcium phosphate with a surface coating to a heavy metal contaminated coated surface, and
    allowing said blend of finely ground calcium phosphate with a surface coating to react with said heavy metal compounds in said heavy metal contaminated coated surface to render said heavy metal compounds immobile and biologically nonhazardous.

8. A method for in situ treatment of heavy metal contaminated surface coatings according to claim 7 wherein:
    said calcium phosphate is in the form of at least one compound selected from the group consisting of: naturally occurring apatite, synthetic hydroxyapatite, dibasic calcium phosphate, and phosphate rock.

9. A method for in situ treatment of heavy metal contaminated surface coatings, comprising:
    determining the amount and type of heavy metal compounds in a heavy metal contaminated surface coating to be decontaminated,
    blending a mixture of an abrasive blasting media with an amount of calcium phosphate in sufficient concentration to react with the heavy metals in said heavy metal contaminated surface coating,
    abrasive blasting said heavy metal contaminated surface coating and removing said heavy metal contaminated surface coating by said abrasive blasting from a coated surface with said mixture,
    allowing said calcium phosphate to react with said heavy metals in said heavy metal contaminated surface coating removed by abrasive blasting to render said heavy metals immobile and biologically nonhazardous, and
    leaving said mixture of abrasive blasting media and calcium phosphate and the surface coating removed by said abrasive blasting in place on the ground.

10. A method for in situ treatment of heavy metal contaminated surface coatings according to claim 9 wherein:
    said abrasive blasting media is in the form of at least one compound selected from the group consisting of: sand, coal slag and glass beads.

11. A method for in situ treatment of heavy metal contaminated surface coatings according to claim 10 wherein:
    said calcium phosphate is in the form of at least one compound selected from the group consisting of: naturally occurring apatite, synthetic hydroxyapatite, dibasic calcium phosphate, and phosphate rock.

12. A method for in situ treatment of heavy metal contaminated soil or solid waste, comprising:
    determining the amount and type of heavy metal compounds in heavy metal contaminated soil or solid waste be decontaminated, blending an amount of calcium phosphate in sufficient concentration to react with the heavy metals in said heavy metal contaminated soil or solid waste, allowing said calcium phosphate to react with said heavy metals in said heavy metal contaminated soil or solid waste to render said heavy metals immobile and biologically nonhazardous, and leaving said mixture of calcium phosphate and soil or solid waste treated by said calcium phosphate in place.

13. A method for in situ treatment of heavy metal contaminated soil or solid waste according to claim 12 wherein:

said calcium phosphate is in the form of at least one compound selected from the group consisting of: naturally occurring apatite, synthetic hydroxyapatite, dibasic calcium phosphate, and phosphate rock.

14. A method for in situ treatment of heavy metal contaminated surfaces, comprising:

determining the amount and type of heavy metal compounds in heavy metal contaminated surfaces to be cleaned and decontaminated, blending an amount of calcium phosphate with a cleaning compound in sufficient concentration to react with the heavy metals in said heavy metal contaminated surfaces, washing said heavy metal contaminated surfaces with said cleaning compound, and allowing said calcium phosphate to react with said heavy metals compounds washed from said heavy metal contaminated surfaces to render said heavy metal compounds immobile and biologically nonhazardous.

15. A method for in situ treatment of heavy metal contaminated surfaces according to claim 15 wherein:

said calcium phosphate is in the form of at least one compound selected from the group consisting of: naturally occurring apatite, synthetic hydroxyapatite, dibasic calcium phosphate, and phosphate rock.

16. A method for in situ treatment of filters in heavy metal contaminated fluid streams, comprising:

determining the amount and type of heavy metal compounds in fluid streams to be filtered to treat heavy metal contamination, applying an amount of calcium phosphate to said filters in sufficient concentration to react with the heavy metals in said heavy metal contaminated fluid streams, and allowing said calcium phosphate to react with said heavy metals compounds trapped by said filters to render said heavy metal compounds immobile and biologically nonhazardous.

17. A method for in situ treatment of heavy metal contaminated surfaces according to claim 16 wherein:

said calcium phosphate is in the form of at least one compound selected from the group consisting of: naturally occurring apatite, synthetic hydroxyapatite, dibasic calcium phosphate, and phosphate rock.

* * * * *